United States Patent
Takahashi et al.

(10) Patent No.: US 9,947,942 B2
(45) Date of Patent: *Apr. 17, 2018

(54) TITANIUM MATERIAL OR TITANIUM ALLOY MATERIAL FOR FUEL CELL SEPARATOR HAVING HIGH CONTACT CONDUCTIVITY WITH CARBON AND HIGH DURABILITY, FUEL CELL SEPARATOR INCLUDING THE SAME, AND FUEL CELL

(71) Applicant: NIPPON STEEL & SUMITOMO METAL CORPORATION, Tokyo (JP)

(72) Inventors: Kazuhiro Takahashi, Tokyo (JP); Taku Kagawa, Tokyo (JP); Hiroshi Kihira, Tokyo (JP); Kiyonori Tokuno, Tokyo (JP); Takumi Nishimoto, Tokyo (JP); Koki Tanaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 14/646,678

(22) PCT Filed: Jan. 31, 2014

(86) PCT No.: PCT/JP2014/052274
§ 371 (c)(1),
(2) Date: May 21, 2015

(87) PCT Pub. No.: WO2014/119734
PCT Pub. Date: Aug. 7, 2014

(65) Prior Publication Data
US 2015/0280251 A1 Oct. 1, 2015

(30) Foreign Application Priority Data

Feb. 1, 2013 (JP) .................................. 2013-018976

(51) Int. Cl.
*H01M 2/08* (2006.01)
*H01M 8/0208* (2016.01)
(Continued)

(52) U.S. Cl.
CPC .......... *H01M 8/0208* (2013.01); *C22C 14/00* (2013.01); *C23C 8/10* (2013.01); *H01M 8/0206* (2013.01);
(Continued)

(58) Field of Classification Search
CPC ............. H01M 8/0208; H01M 8/0206; H01M 8/0247; H01M 2008/1095; H01M 2250/20; C22C 14/00; C23C 8/10; Y02P 70/56
See application file for complete search history.

(56) References Cited

U.S. PATENT DOCUMENTS 6,379,476 B1    4/2002  Tarutani et al.
2005/0014053 A1* 1/2005  Ohtani ................ C22C 38/02
                                                    429/517
(Continued)

FOREIGN PATENT DOCUMENTS

EP    1 726 674 A1   11/2006
EP    1 806 799 A1    7/2007
(Continued)

OTHER PUBLICATIONS

Canadian Office Action, dated Sep. 2, 2016, for Canadian Application No. 2,890,426.
(Continued)

*Primary Examiner* — Raymond Alejandro
(74) *Attorney, Agent, or Firm* — Birch, Stewart, Kolasch & Birch, LLP (57) ABSTRACT

A titanium or titanium alloy material for a fuel cell separator has a surface shape in which a plurality of projections are (Continued)

distributed, and a titanium oxide film on a surface of the projections. Fine projections are assumed to increase the contact conductivity remarkably. By increasing contact conductivity with carbon and durability of a titanium or titanium alloy material for a fuel cell separator, the lifetime of a fuel cell may be increased. The material has high usability in the cell manufacturing industry.

7 Claims, 7 Drawing Sheets (51) Int. Cl.
*C23C 8/10* (2006.01)
*C22C 14/00* (2006.01)
*H01M 8/0206* (2016.01)
*H01M 8/0247* (2016.01)
*H01M 8/1018* (2016.01)

(52) U.S. Cl.
CPC .. *H01M 8/0247* (2013.01); *H01M 2008/1095* (2013.01); *H01M 2250/20* (2013.01); *Y02P 70/56* (2015.11); *Y02T 90/32* (2013.01)

(56) References Cited

U.S. PATENT DOCUMENTS

| | | |
|---|---|---|
| 2007/0259221 A1 | 11/2007 | Tarutani et al. |
| 2008/0233456 A1 | 9/2008 | Ishikawa et al. |
| 2009/0226785 A1 | 9/2009 | Kihira et al. |
| 2009/0226787 A1 | 9/2009 | Tanaka et al. |
| 2011/0024002 A1 | 2/2011 | Ishikawa et al. |
| 2011/0032537 A1 | 2/2011 | Kihira et al. |
| 2011/0177430 A1 | 7/2011 | Takahashi et al. |
| 2012/0088185 A1 | 4/2012 | Maeda et al. |
| 2012/0171468 A1 | 7/2012 | Tanaka et al. |
| 2013/0130153 A1 | 5/2013 | Suzuki et al. |
| 2013/0157160 A1* | 6/2013 | Yoshimura ........ H01M 8/04007 429/434 |
| 2013/0164654 A1 | 6/2013 | Suzuki et al. |
| 2013/0251876 A1 | 9/2013 | Nagayama |
| 2013/0316262 A1 | 11/2013 | Ishii et al. |
| 2015/0030957 A1 | 1/2015 | Van Boeyen et al. |
| 2015/0325864 A1* | 11/2015 | Nishimoto ............ C22C 14/00 429/516 |

FOREIGN PATENT DOCUMENTS

| | | |
|---|---|---|
| EP | 2 626 440 A1 | 8/2013 |
| JP | 2000-328200 A | 11/2000 |
| JP | 2004-273370 A | 9/2004 |
| JP | 2005-38823 A | 2/2005 |
| JP | 2005-56776 A | 3/2005 |
| JP | 2005-209399 A | 8/2005 |
| JP | 2006-140095 A | 6/2006 |
| JP | 2006-156228 A | 6/2006 |
| JP | 2007-005084 * | 1/2007 .............. H01M 8/02 |
| JP | 2007-5084 A | 1/2007 |
| JP | 2007-103075 A | 4/2007 |
| JP | 2007-131947 A | 5/2007 |
| JP | 2007-234244 A | 9/2007 |
| JP | 2009-238560 A | 10/2009 |
| JP | 2010-97840 A | 4/2010 |
| JP | 2010-108673 A | 5/2010 |
| JP | 2010-129458 A | 6/2010 |
| JP | 2010-238577 A | 10/2010 |
| JP | 2010-248570 A | 11/2010 |
| JP | 2010-248572 A | 11/2010 |
| JP | 2010-280989 A | 12/2010 |
| JP | 2011-77018 A | 4/2011 |
| JP | 2012-28045 A | 2/2012 |
| JP | 2012-28046 A | 2/2012 |
| JP | 2012-28047 A | 2/2012 |
| JP | 2012-43775 A | 3/2012 |
| JP | 2012-43776 A | 3/2012 |
| JP | 2012-170363 A | 9/2012 |
| WO | WO 2010/038544 A1 | 4/2010 |
| WO | WO 2011/016465 A1 | 2/2011 |
| WO | WO 2012/046879 A1 | 4/2012 |

OTHER PUBLICATIONS

Extended European Search Report dated May 3, 2016 issued in European Patent Appliction No. 14745462.3.
International Preliminary Report on Patentability, issued in PCT/JP2014/052274, dated Jan. 14, 2015.
International Search Report, issued in PCT/JP2014/052274, dated Apr. 15, 2014.
Lütjering et al., "Ti-2003 Science and Technology", Proceedings of the 10th World Conference on Titanium, Held at the CCH-Congress Center Hamburg, Germany, Jul. 13-18, 2013, Wiley-VCH Verlag GmbH & Co. KGaA, Hamburg, 2004, vol. V, pp. 3117-3124.
Written Opinion of the International Searching Authority, issued in PCT/JP2014/052274, dated Apr. 15, 2014.
Canadian Office Action, dated Sep. 7, 2016, for Canadian Application No. 2,891,182.
Extended European Search Report for European Application No. 14746712.0, dated May 27, 2016.

* cited by examiner

(a-1) CONVENTIONAL MATERIAL
(SKIN SUBJECTED TO COLD ROLLING)

(b) PRESENT INVENTION MATERIAL (a-2) CONVENTIONAL MATERIAL
(SKIN SUBJECTED TO COMMON ACID CLEANING USING FLUONITRIC ACID)

PRESENT INVENTION MATERIAL

TITANIUM MATERIAL OR TITANIUM ALLOY MATERIAL FOR FUEL CELL SEPARATOR HAVING HIGH CONTACT CONDUCTIVITY WITH CARBON AND HIGH DURABILITY, FUEL CELL SEPARATOR INCLUDING THE SAME, AND FUEL CELL

TECHNICAL FIELD

The present invention relates to a titanium or titanium alloy material that is used for a separator of a polymer electrolyte fuel cell having low contact resistance, the polymer electrolyte fuel cell being used for automobiles that operate by using electric power as driving power, power generation systems, and the like. That is, the present invention relates to a titanium or titanium alloy material for a fuel cell separator having high contact conductivity with carbon and high durability, and a fuel cell separator including the same.

BACKGROUND ART

In recent years, as fuel cells for automobiles, polymer electrolyte fuel cells have started to progress rapidly. The polymer electrolyte fuel cell is a fuel cell that uses hydrogen and oxygen, and also uses an organic film (composites with inorganic materials are also being developed) of a hydrogen-ion-selective-transmission type as electrolyte. Examples of hydrogen used as a fuel include pure hydrogen and a hydrogen gas obtained by modifying alcohols.

However, current fuel cell systems use components and members having high unit costs, and the cost for components and members needs to be lowered largely for consumer use. Further, for use in automobiles, the current fuel cell systems need not only to lower the cost, but also to downsize a stack, which serves as the center of the fuel cell. A polymer electrolyte fuel cell has a structure in which a membrane electrode assembly (hereinafter also referred to as MEA) including a solid polymer film, electrodes, and a gas diffusion layer, is sandwiched between separators, and a large number of MEAs are laminated to form a stack.

Examples of characteristics required for the separator include electron conductivity, a property of isolating an oxygen gas and a hydrogen gas at the respective electrodes, low contact resistance with the MEA, favorable durability in the environment inside a fuel cell, and the like. Here, the gas diffusion layer (GDL) in the MEA is generally formed with a carbon paper consisting of integrated carbon fibers, and accordingly, the separator is required to have favorable contact conductivity with carbon.

Since a stainless steel, a titanium material, and the like, which is used as materials for a separator, generally has low contact conductivity with carbon without any treatment, many techniques have been proposed to increase the contact conductivity with carbon. A passivation film having low conductivity can serve as an obstacle to higher contact conductivity with carbon. Although this problem could be solved at the expense of the durability, extremely high durability is still required for a separator in the environment inside the fuel cell, which is a highly corrosive environment.

For this reason, currently, it is quite difficult to develop a satisfactory metal material for a separator. Carbon separators have been the mainstream so far; however, if meal separators become available, the fuel cell itself can be downsized, and further, a break will not occur in the manufacturing process of the fuel cell. Accordingly, metal separators are strongly demanded to enable mass production and diffusion.

Under such circumstances, for example, Patent Document 1 discloses a technique that makes it possible to lower contact resistance of a stainless steel effectively, in terms of thinning, reducing weight, and the like, by use of a special stainless steel obtained by precipitating a conductive compound in a steel material.

Highly durable titanium is also being studied to be used for a separator. In the same manner as a stainless steel, titanium has high contact resistance with the MEA by the presence of a passivation film on the outermost surface of titanium, and accordingly, for example, Patent Document 2 discloses a technique that enables a TiB-based precipitate to be diffused in titanium and the contact resistance with the MEA to be lowered.

Patent Document 3 discloses a titanium alloy for a separator. The titanium alloy contains, by mass %, 0.5 to 15% Ta and a limited amount of Fe and O as necessary. Further, in the titanium alloy, a range from the outermost surface to 0.5 µm in depth has an average nitrogen concentration of greater than or equal to 6 atomic %, and contains tantalum nitride and titanium nitride.

Patent Document 3 also discloses that, in a method for manufacturing a titanium alloy for a separator, it is preferable to heat the titanium alloy at temperatures of 600 to 1000° C. for three seconds or more under a nitrogen atmosphere.

Patent Documents 4, 5, and 6 disclose a technique to thrust a conductive material into the superficial layer by a blasting method or a roll processing method in a manufacturing process of a titanium or stainless steel metal separator. In this technique, a surface microstructure in which the conductive material is disposed to penetrate a passivation film formed on the metal surface secures both contact conductivity with carbon and durability.

Patent Document 7 discloses a method for manufacturing a fuel cell separator, including converting impurities including titanium carbide or titanium nitride formed on the surface of titanium into oxide by anode oxidizing treatment, and then performing plating treatment. Titanium carbide or titanium nitride formed on the surface of titanium is dissolved while being exposed to a corrosive environment and is re-precipitated as oxide that inhibits contact conductivity to lower the contact conductivity.

The above method suppresses oxidation of these impurities during generation of electricity (during use) and increases durability. However, to secure conductivity and durability, an expensive plated film is necessary.

Patent Document 8 discloses a technique to form an oxide film as a corrosion-resistant film by coating the surface of a titanium-based alloy with BN powder and by performing heat treatment thereon, the titanium-based alloy being used as a base material and being obtained by alloying Group 3 elements in the periodic table.

This is a technique to increase conductivity by doping, with impurity atoms, a position of a titanium atom in a crystal lattice of the oxide film serving as a passivation film of the titanium alloy.

Patent Documents 9 and 10 disclose a technique to form, in rolling processing of a fuel cell separator made of titanium, an altered layer containing titanium carbide on the superficial layer by rolling using carbon-containing rolling oil, and to form a high-density carbon film thereon to secure conductivity and durability.

In this technique, although conductivity with a carbon paper is increased, since durability is maintained by the carbon film, a fine carbon film needs to be formed. The interface between simple carbon and titanium has high contact resistance, and accordingly, titanium carbide that increases conductivity is disposed therebetween. However, in a case in which the carbon film has a defect, the altered layer (including titanium carbide) and the base material cannot be prevented from being corroded, and a corrosion product that inhibits contact conductivity may be generated.

Patent Documents 11, 12, 13, 14, and 15 disclose a titanium fuel cell separator that has a structure similar to that disclosed in Patent Document 9, which is a structure mainly including a carbon layer, a titanium carbide intermediate layer, and a titanium base material in this order. Although a manufacturing process is different from that in Patent Document 9 in that the titanium carbide intermediate layer is formed after the carbon layer is formed in advance, a mechanism of increasing durability by the carbon layer is similar.

Patent Document 16 discloses a technique to apply graphite powder to perform rolling and annealing for mass production. This technique enables the function of a conventional carbon separator by adding the carbon layer and the titanium carbide intermediate layer to the surface of an unbreakable titanium base material. However, since the titanium carbide intermediate layer has low durability, there remains a concern that this surface structure can generate a corrosion product that inhibits contact conductivity because the titanium carbide intermediate layer and the base material cannot be prevented from being corroded in a case in which the carbon film has a defect.

Under such circumstances, Patent Document 17 discloses a technique to dispose titanium carbide or titanium nitride, which is a conductive material, on the surface of titanium, and to cover not only titanium but also the conductive materials with titanium oxide having a passivation function.

This technique secures contact conductivity, and in addition, increases durability. However, it is necessary to further increase environmental deterioration resistance of the titanium oxide film covering the conductive materials in order to further lengthen the lifetime of the fuel cell.

Accordingly, the present applicants proposed, in Patent Document 18, a titanium or titanium alloy material for a fuel cell separator having high contact conductivity with carbon. This technique mainly increases durability by performing passivation treatment on a titanium oxide film in which the titanium oxide film is immersed in an aqueous solution containing an oxidizing agent such as nitric acid or chromic acid. In this technique, in addition, titanium compound particles including carbon or nitrogen that is a fine conductive material are dispersed in an oxide film on the surface of the titanium or titanium alloy material.

Patent Document 19 proposes to perform stabilization treatment after the passivation treatment in an aqueous solution using carbide, nitride, carbonitride, or boride of tantalum, titanium, vanadium, zirconium, or chromium as the fine conductive material. This stabilization treatment uses an aqueous solution including rice flour, wheat flour, potato starch, corn flour, soy flour, a pickling corrosion inhibitor, and the like, which are natural products and artificial synthetic substances containing one or more selected from amine-based compounds, aminocarboxylic-acid-based compounds, phospholipid, starch, calcium ions, and polyethylene glycol.

The internal environment and simulating and evaluating conditions of a polymer electrolyte fuel cell will be described later.

Patent Documents 20, 21, 22, 23, and 24 disclose that fluorine is eluted when using fluorine-based solid polymer for an electrolyte film, and it is known that a minute amount of hydrogen fluoride environment is generated in this case. Meanwhile, in a case of using a hydrocarbon polymer, it is considered that fluorine is not eluted from the electrolyte film.

Further, Patent Document 24 discloses that pH of an exhaustion liquid is about 3 in experiment. Patent Document 10 employs constant potential corrosion tests in which a potential of 1V is applied in a 50° C. aqueous sulfuric acid having a pH of 4, and Patent Documents 11, 12, 13, and 14 employ durability evaluating tests in which a potential of 0.6V is applied in a 80° C. aqueous sulfuric acid having a pH of about 2.

Patent Document 25 discloses that the driving temperature is about 80 to 100° C., for example, and Patent Documents 21 and 24 employ 80° C. as an evaluation condition. From the above, it is easily assumed that the evaluation conditions for simulating a polymer electrolyte fuel cell is an aqueous solution in which fluorine is dissolved by a solid polymer of an electrolyte film having a pH of 2 to 4, temperatures of 50 to 100° C., cell voltage changes of 0 to 1V (the voltage is 0 before power generation).

On the other hand, from the viewpoint of environment resistance of titanium, it is commonly known that titanium is dissolved by a hydrogen fluoride aqueous solution (hydrofluoric acid). Non-Patent Document 1 discloses that the addition of about 2 ppm or about 20 ppm fluorine to a pH3 aqueous sulfuric acid promotes discoloration of titanium. This discoloration is caused in a manner that titanium is dissolved and re-precipitated as an oxide on the surface, the oxide film grows, and an interference color is generated. As described above, the re-precipitated oxide is a material that inhibits contact conductivity. Accordingly, an environment in which fluorine is eluted in a fuel cell is a more harsh condition for titanium, so that durability needs to be further increased so as not to increase contact resistance.

PRIOR ART DOCUMENTS

Patent Documents

[Patent Document 1] JP 2000-328200A
[Patent Document 2] JP 2004-273370A
[Patent Document 3] JP 2007-131947A
[Patent Document 4] JP 2007-005084A
[Patent Document 5] JP 2006-140095A
[Patent Document 6] JP 2007-234244A
[Patent Document 7] JP 2010-097840A
[Patent Document 8] JP 2010-129458A
[Patent Document 9] JP 2010-248570A
[Patent Document 10] JP 2010-248572A
[Patent Document 11] JP 2012-28045A
[Patent Document 12] JP 2012-28046A
[Patent Document 13] JP 2012-43775A
[Patent Document 14] JP 2012-43776A
[Patent Document 15] JP 2012-28047A
[Patent Document 16] JP 2011-77018A
[Patent Document 17] WO2010038544A
[Patent Document 18] WO11/016465A
[Patent Document 19] JP 2012-170363A
[Patent Document 20] JP 2005-209399A
[Patent Document 21] JP 2005-56776A
[Patent Document 22] JP 2005-38823A
[Patent Document 23] JP 2010-108673A
[Patent Document 24] JP 2009-238560A
[Patent Document 25] JP 2006-156228A Non-Patent Document

[Non-Patent Document 1] Ti-2003 Science and Technology, G. Lutjering and J. Albrecht, Wiley-VCH Verlag GmbH & Co., Hamburg, 2004, pp. 3117-3124.

SUMMARY OF THE INVENTION

Problems to be Solved by the Invention

An object of the present invention is to further increase contact conductivity (low contact resistance) with carbon and durability of a titanium or titanium alloy material for a fuel cell separator having high contact conductivity with carbon so as to further increase the lifetime of a fuel cell. Specifically, an object is to further increase the durability with respect to (1) fluorine ions and (2) voltage application in an acid environment.

Means for Solving the Problem(s)

As described above, conventionally, in order to overcome high contact resistance of titanium and a titanium alloy with carbon, a mainstream technique covers the surface thereof with a carbon layer as a conductive material or disperses fine carbide, nitride, carbonitride, or boride of titanium, tantalum, or the like, in an oxide film.

After intense study on a method to solve the above problems, the present inventors have found out that the surface state of the titanium or titanium alloy material itself has a great influence on the contact conductivity with carbon and the durability.

Further, the present inventors have found out that the above problems can be solved by, unlike in the conventional techniques, (i) not using the carbon layer that has been conventionally used as the conductive material, carbide, nitride, carbonitride, and/or boride of titanium, tantalum, or the like, but (ii) forming fine projections of a submicron order to several-micron order formed of titanium or a titanium alloy.

The present invention has been made based on the above knowledge and a summary thereof is as follows.

(1) A titanium or titanium alloy material for a fuel cell separator, including:
a surface shape in which a plurality of projections are distributed,
wherein the projections have a tip angle θ of less than or equal to 60'; and
a titanium oxide film on a surface of the projections.

(2) The titanium or titanium alloy material for a fuel cell separator according to (1),
wherein a surface roughness RSm is 0.5 to 5.0 μn.

(3) The titanium or titanium alloy material for a fuel cell separator according to (1) or (2),
wherein a surface roughness Ra is 0.05 to 0.50 μm.

(5) The titanium or titanium alloy material for a fuel cell separator according to any one of (1) to (3),
wherein the titanium oxide film is a titanium oxide film that is subjected to heat treatment at 260 to 550° C. and has a thickness of 3 to 15 nm.

(6) The titanium or titanium alloy material for a fuel cell separator according to any one of (1) to (3) and (5),
wherein, as a result of oblique incident X-ray diffraction, metal titanium and a titanium compound are detected on the surface, the titanium compound having a crystal lattice spacing of any one of 2.48 Å 1%, 2.15 Å±1%, and 1.52 Å±1%.

(7) The titanium or titanium alloy material for a fuel cell separator according to any one of (1) to (3), (5), and (6), wherein a contact resistance with a carbon paper is less than or equal to 10 mΩ·cm² at a contact pressure of 10 kgf/cm².

(8) The titanium or titanium alloy material for a fuel cell separator according to any one of (1) to (3) and (5) to (7),
wherein a contact resistance with a carbon paper is less than or equal to 20 mΩ·cm² at a contact pressure of 10 kgf/cm² after an accelerated deterioration test in which the titanium or titanium alloy material is immersed in an aqueous sulfuric acid having an adjusted pH of 3 at 80° C. for four days.

(9) A fuel cell separator including:
the titanium or titanium alloy material for a fuel cell separator according to any one of (1) to (3) and (5) to (8).
(10) A polymer electrolyte fuel cell including:
the fuel cell separator according to (9).

Effects of the Invention

According to the present invention, it becomes possible to provide a titanium or titanium alloy material for a fuel cell separator having high contact conductivity with carbon and high durability. Accordingly, it becomes possible to largely increase the life time of a fuel cell.

MODE(S) FOR CARRYING OUT THE INVENTION

A titanium or titanium alloy material (hereinafter also referred to as "present invention material") for a fuel cell separator having high contact conductivity with carbon and high durability according to the present invention has a surface shape in which a plurality of fine projections are distributed densely, and a titanium oxide film is formed on surfaces of the projections.

Specifically, the surface in which the plurality of fine projections are distributed densely has a surface roughness RSm of 0.5 to 5.0 μm and/or a surface roughness Ra of 0.05 to 0.50 μm.

The present invention material will be described in detail below with reference to the appended drawings.

Figure 1:
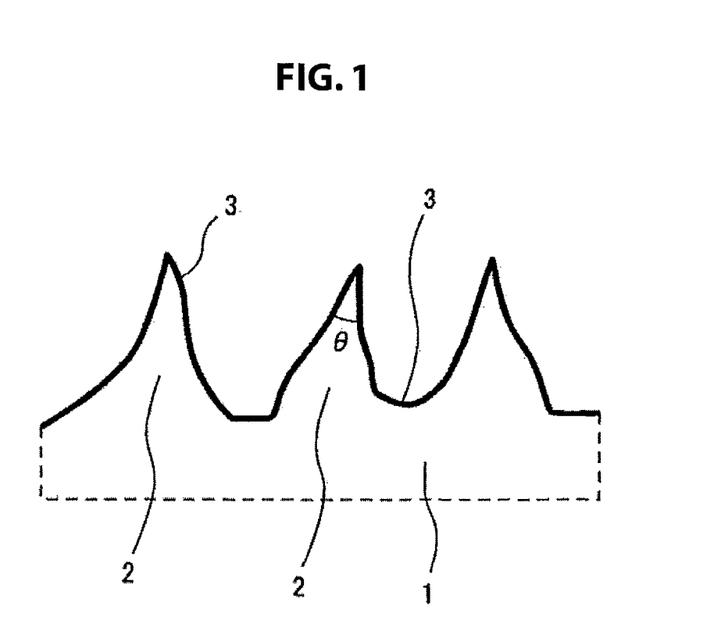
FIG. 1 schematically shows a cross-sectional structure immediately under a surface of a titanium or titanium alloy material for a fuel cell separator according to the present invention.

FIG. 1 schematically shows a cross-sectional structure immediately under a surface of the titanium or titanium alloy material for a fuel cell separator according to the present invention. On a surface of a titanium or titanium alloy material 1, a large number of fine projections 2 are distributed densely. Further, surfaces of the plurality of projections 2 are covered with a titanium oxide film 3 formed along the surface shape of the projections 2. The titanium oxide film 3 is a titanium oxide film subjected to heat treatment at 260 to 500° C. as stabilization treatment.

In the present invention material, on the surface of the titanium or titanium alloy material 1 (hereinafter also referred to as "titanium base material") serving as a base of a fuel cell separator, fine projections 2 of a submicron order to several-micron order are distributed densely. The fine projections 2 have sharp tips. Further, along the shape of the fine projections 2, the titanium oxide film 3 that has been subjected to passivation treatment in a certain aqueous solution and stabilization treatment thereafter is formed.

The present invention material can be obtained by forming the plurality of projections 2 having sharp tips (hereinafter this treatment is also referred to as "surface formation treatment") on the surface of the titanium base material and then by performing heat treatment at 260 to 550° C. as stabilization treatment.

Figure 2:
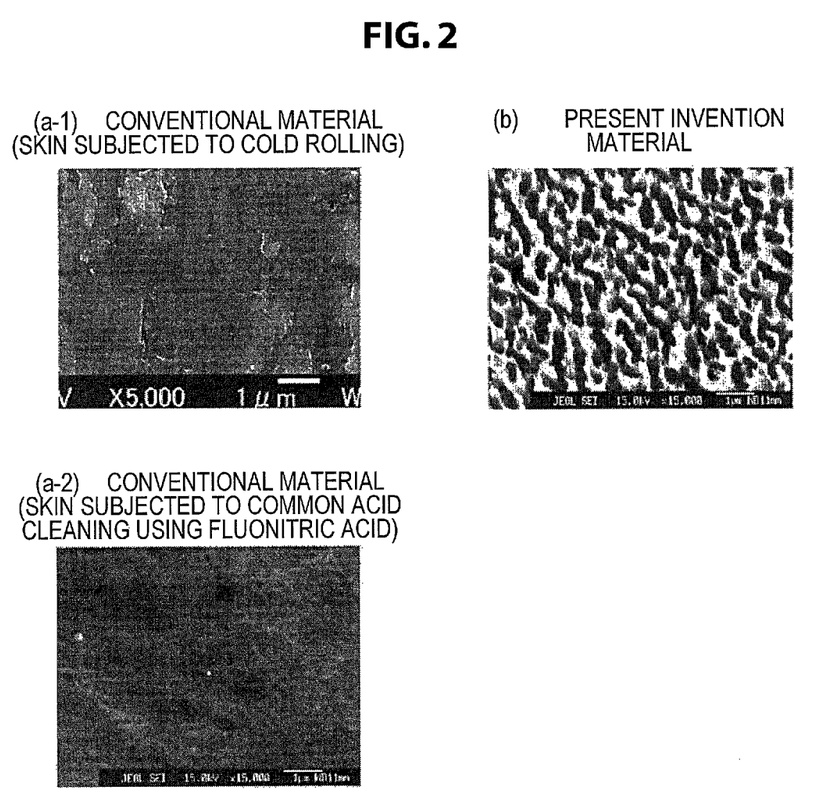
FIG. 2 shows scanning electron microscope (SEM) images of surfaces of a titanium or titanium alloy material for a fuel cell separator. (a-1) shows a surface (a skin subjected to cold rolling) of a conventional titanium or titanium alloy material for a fuel cell separator, and (a-2) shows a surface (a skin subjected to common pickling using fluonitric acid) of a conventional titanium or titanium alloy material for a fuel cell separator. (b) shows a surface (in which fine projections are distributed densely) of a titanium or titanium alloy material for a fuel cell separator according to the present invention.

Here, FIG. 2 shows scanning electron microscope (SEM) images of surfaces of a titanium or titanium alloy material for a fuel cell separator. FIG. 2 (a-1) shows a surface (a skin subjected to cold rolling) of a conventional titanium or titanium alloy material for a fuel cell separator, and FIG. 2 (a-2) shows a surface (a skin subjected to common pickling using fluonitric acid) of a conventional titanium or titanium alloy material for a fuel cell separator. FIG. 2 (b) shows a surface (in which fine projections are distributed densely) of the titanium or titanium alloy material for a fuel cell separator according to the present invention (the present invention material).

As shown in FIG. 2 (a-1) and FIG. 2 (a-2), fine projections do not exist on the surface of the conventional material; in contrast, as shown in FIG. 2 (b), fine projections are distributed densely on the surface of the present invention material. On the surface of the titanium base material, holes each having a depth of about 1 μm are distributed at intervals of about 0.5 μn. The fine projections are formed between the holes.

Figure 3:
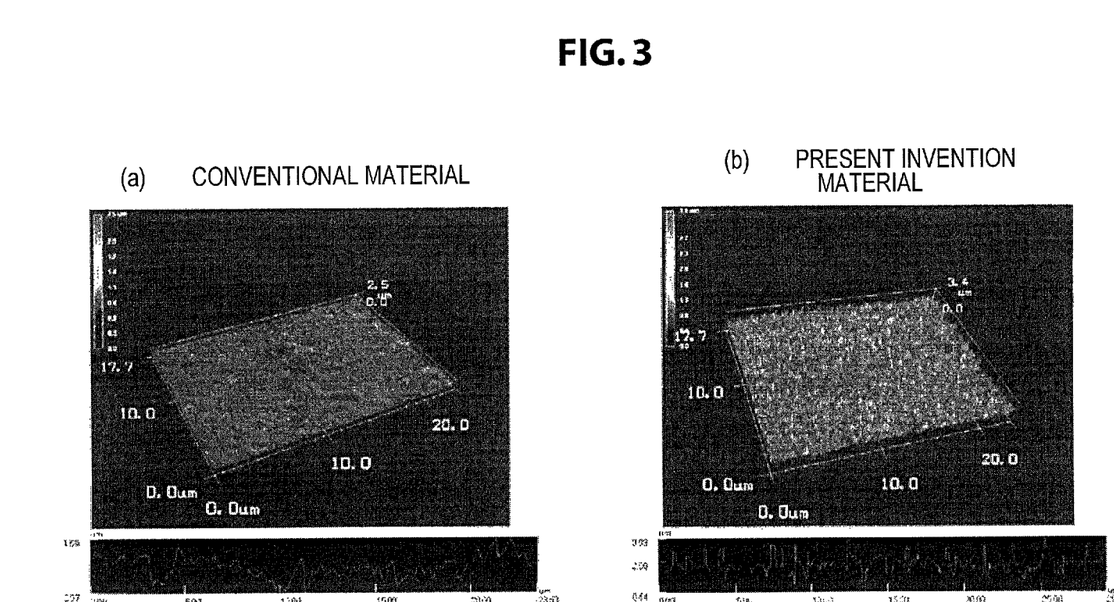
FIG. 3 shows 3D images obtained through measuring surfaces of a titanium or titanium alloy material for a fuel cell separator with a three-dimensional laser roughness meter and a cross-sectional profile thereof (a) shows a surface of a conventional titanium or titanium alloy material for a fuel cell separator. (b) shows a surface of a titanium or titanium alloy material for a fuel cell separator according to the present invention.

FIG. 3 shows 3D images obtained through measuring surfaces of the titanium or titanium alloy material for a fuel cell separator with a three-dimensional laser roughness meter and a cross-sectional profile thereof. FIG. 3 (a) shows the surface of the conventional material and FIG. 3 (b) shows the surface of the present invention material. It is shown that fine projections are distributed densely on the surface of the present invention material.

Figure 4:
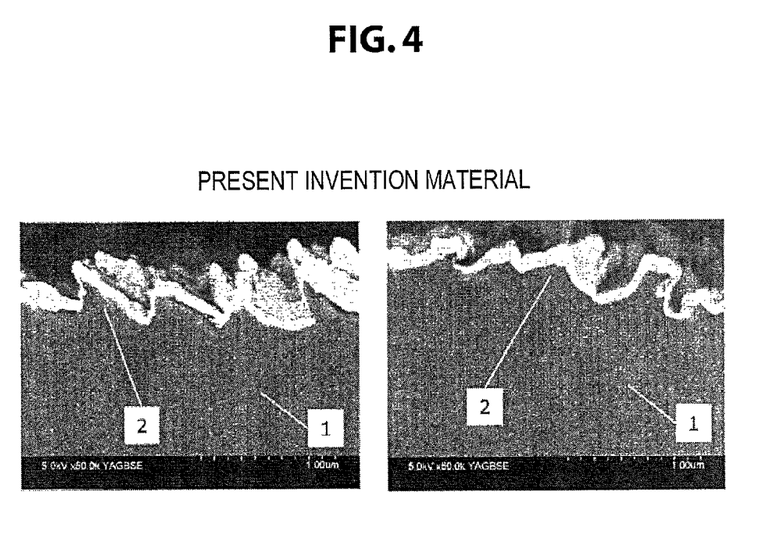
FIG. 4 shows scanning electron microscope (SEM) images of cross sections immediately under a surface of a titanium or titanium alloy material for a fuel cell separator according to the present invention.
Figure 5:
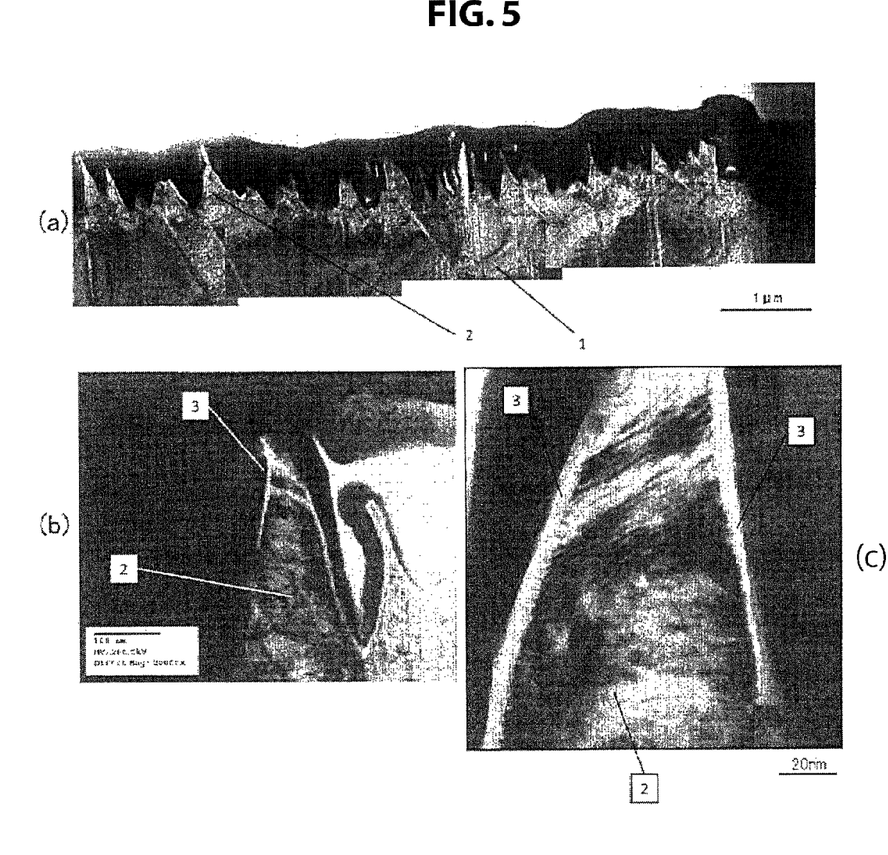
FIG. 5 shows transmission type electron microscope images of cross sections immediately under a surface of a titanium or titanium alloy material for a fuel cell separator according to the present invention. (a) shows the entire cross section immediately under the surface. (b) shows an enlarged part of the cross section immediately under the surface. (c) shows a cross section of a fine projection.

FIG. 4 shows scanning electron microscope (SEM) images of cross sections immediately under the surface of the present invention material. It is shown that the fine projections 2 are distributed densely on the surface of the titanium or titanium alloy material 1. Further, FIG. 5 shows transmission type electron microscope images of cross sections immediately under the surface of the present invention material. FIG. 5 (a) shows the entire cross section immediately under the surface. FIG. 5 (b) shows an enlarged part of the cross section immediately under the surface. FIG. 5 (c) shows a cross section of the fine projection 2.

It is shown that the fine projections 2 are distributed densely on the surface of the titanium or titanium alloy material 1 (see FIG. 5 (a)), and that the fine projections 2 are covered with the titanium oxide film 3 (see FIGS. 5 (b) and (c)). Note that the titanium oxide film 3 has been subjected to stabilization treatment of heating at 260 to 550° C.

In this manner, the surface state of the titanium base material 1 of the present invention material has a feature, and this feature leads to a remarkable increase in the contact conductivity with carbon.

The surface state of the present invention material is regulated by an average length RSm of a contour curve element of JIS. RSm is an index indicating the average top and bottom interval of roughness. As the value of RSm is smaller, the roughness is distributed more densely. RSm is suitable for the index that regulates the surface characteristics averagely.

The surface roughness RSm is preferably 0.5 to 5.0 μm. RSm of less than 0.5 cannot be obtained substantially. If RSm exceeds 5.0 μm, the initial contact resistance will be higher and exceed 10 mΩ·cm². RSm is more preferably 2.0 to 4.0 μm in which range stable manufacture is possible.

For reference, a skewness Rsk of a roughness curve, which is a measure of skewness of the surface roughness becomes positive when projection parts are distributed on a smooth surface, and is about 0.1 to 0.9 in the present invention. That is, the probability density of the projection parts is higher.

Further, as shown in the cross-sectional images of FIG. 4 and FIG. 5, some fine projections having a height of a submicron order project like eaves in an oblique direction from the surface of the base material, in which case, portions under the eaves might be in the shadow of laser under a laser microscope. By use of the cross-sectional images of FIG. 4 and FIG. 5, an average interval p of the projections is calculated by Expression (2), which will be described later, to be 0.15 to 1.5 μm in the present invention. Although RSm is averagely suitable for the index that regulates the surface state on which the fine projections are formed densely, the index may be regulated by the average interval p that is calculated by using the cross-sectional images.

The surface state is preferably regulated by an arithmetic average roughness Ra of JIS, in addition to RSm. If Ra is less than 0.05 μm, the initial contact resistance will be higher and exceed 10 mΩ·cm². Ra of greater than 0.50 μm cannot be obtained substantially. Ra is more preferably 0.10 to 0.25 μm in which range stable manufacture is possible. Note that a maximum height Rz is 0.5 to 5.0 nm, preferably 1.0 to 2.0 μm.

In the surface state of the present invention material, it is more preferable that the surface roughness RSm be 0.5 to 5.0 μm and that the surface roughness Ra be 0.05 to 0.50 μm because in which case the contact conductivity with carbon is increased more stably.

RSm and Ra, each of which is surface roughness, are measured on the surface of the titanium base material by using a color 3D laser microscope VK-8700 (produced by Keyence Corporation) on the basis of JISB 0601:2001. For the measurement, a 100-fold magnification objective lens is used, and a measurement area of 23.53×17.64 nm observed at 2000 folds is measured by planar measurement to calculate Ra and is measured by linear measurement to calculate RSm. A λs contour curve filter is set to 0.8 μm, and a λc contour curve filter is set to 0.08 mm. Note that a repeating accuracy σ of the above apparatus is 0.03 μm in both the planar measurement and the linear measurement, a display resolution is 0.01 nm in both the height and width.

The contact conductivity with carbon also depends on the tip shape of the fine projection. According to the results of tests executed by the present inventors, the tip angle θ of the tip of the fine projection, which is defined as above, is preferably less than roe equal to 60°. If the tip angle θ exceeds 60°, the initial contact resistance will exceed 10 mΩ·cm². The tip angle θ is more preferably 20 to 60° in which range stable manufacture is possible.

Figure 7:
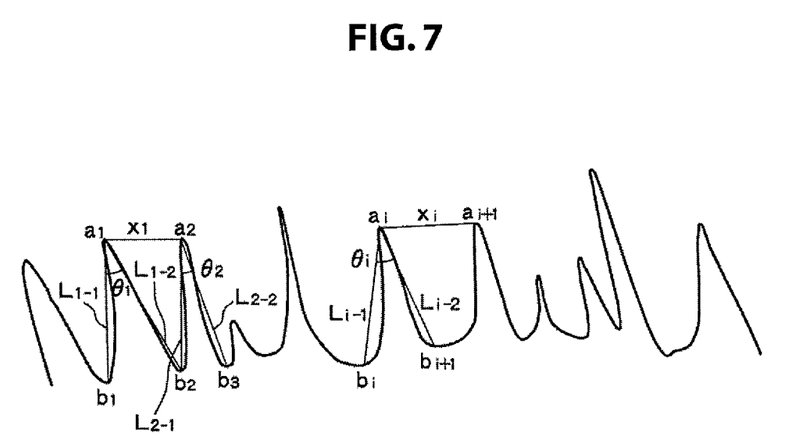
FIG. 7 shows a method for measuring a point angle θ (and a gap p) of a fine projection.

Here, a method for measuring the tip angle θ (and the interval p) will be described with reference to FIG. 7. A cross section including the surface of the present invention material is processed by cross-section polishing (CP) or focusing ion beam machining (FIB) to fabricate samples for cross section observation. The cross section is perpendicular to the surface of the titanium base material. Each sample for cross section observation is observed by a scanning electron microscope or a transmission type electron microscope to obtain the cross-sectional images shown in FIG. 4 and FIG. 5.

In these cross-sectional images, an angle formed by a straight line L1-1 and a straight line L1-2 is measured, and this angle is set as a tip angle θ1, the straight line L1-1 connecting a projection vertex a1 and a recess vertex b1, the straight line L1-2 connecting the projection vertex a1 and a recess vertex b2. In a similar manner, an angle formed by a straight line L2-1 and a straight line L2-2 is measured, and this angle is set as a tip angle θ2, the straight line L2-1 connecting a projection vertex a2 and the recess vertex b2, the straight line L2-2 connecting the projection vertex a2 and a recess vertex b3.

In a similar manner, an angle formed by a straight line Li-1 and a straight line Li-2 is measured, and this angle is set as a tip angle θi, the straight line Li-1 connecting a projection vertex ai and a recess vertex bi, the straight line Li-2 connecting the projection vertex ai and a recess vertex bi+1. Then, the tip angle θ is decided by the following Expression (1).

[Math. 1]

$$\theta = \frac{1}{n}\sum_{i=1}^{n} \theta_i \quad (1)$$

In the expression, n is greater than or equal to 10.

In the above cross-sectional image, the length of a straight line X1 connecting the projection vertex a1 and the projection vertex a2 is set as an interval p1. In a similar manner, the length of a straight line X2 connecting the apex a2 and a projection vertex a3 is set as an interval p2. In a similar manner, the length of a straight line Xi connecting the projection vertex ai and a projection vertex ai+1 is set as an interval pi, and the interval p is decided by the following Expression (2).

[Math. 2]

$$p = \frac{1}{n}\sum_{i=1}^{n} p_i \quad (2)$$

In the expression, n is greater than or equal to 10.

The present invention material has remarkably higher contact conductivity with carbon than the conventional material probably because the following reasons.

The surface of the conventional material is polished to have various kinds of roughness or subjected to common pickling using fluonitric acid does not have a surface state having a feature unlike the surface of the present invention material. That is, on the surface of the conventional material, titanium carbide, titanium nitride, or the like, which secures conductivity, is not formed, so that the contact resistance with a carbon paper is greater than or equal to about 40 mΩ·cm², which is much higher than the initial aim being less than or equal to 10 mΩ·cm².

This means that a natural oxide film on the surface of the titanium or titanium alloy (titanium oxide film formed naturally in the air after polishing or pickling) increases the contact resistance with the carbon paper.

Unlike in the surface state of the conventional material, the present invention material has the fine projections having a sharp tip of a submicron order to several-micron order, which are distributed densely, on the surface of the titanium base material. As a matter of fact, the titanium oxide film exits on the outermost surface of the fine projection; however, the fine projections are assumed to lead to the low contact resistance, which is "less than or equal to 10 mΩ·cm²".

That is, the remarkable increase in the contact conductivity is assumed to be caused by the following reasons, for example. Since the fine projection has a sharp tip with the tip angle θ of less than or equal to 60°, the projections are intertwined with fibers of the carbon paper, which contacts the projections, so that a special electromagnetic environment is formed in which electrons and holes serving as carriers can pass through the titanium oxide film. Further, the fine projections are elastically deformed and the titanium oxide film that tends to have low conductivity is locally thinned, and the contact area is extremely increased.

The titanium oxide film that has been subjected to heat treatment at 260 to 550° C. is formed along the surface shape of the fine projections. The thickness of the titanium oxide film is preferably 3 to 15 nm in order to keep the initial contact resistance low and to secure durability against fluorine in the exposed environment or voltage application. If the thickness is less than 3 nm, the contact resistance will exceed 20 mΩ·cm² after accelerated deterioration tests in which fluorine is added or voltage is applied, so that the durability will become unsufficient. On the other hand, if the thickness exceeds 15 nm, the initial contact resistance will exceed 10 mΩ·cm².

Even when the thickness of the titanium oxide film has a thickness of greater than or equal to 3 nm, if heat treatment is performed at temperatures of less than 260° C., the contact resistance may exceed 20 mΩ·cm² after accelerated deterioration tests in which fluorine is added or voltage is applied; accordingly, heat treatment is performed at temperatures of greater than 260° C. in the present invention. Note that, if the temperature exceeds 550° C., under the air atmosphere, the high heating temperature will cause the titanium oxide film to grow to have a large thickness, and the control will be difficult.

Note that the thickness of the titanium oxide film is measured through observation of a cross section immediately under the surface by using a transmission type electron microscope. The titanium oxide film corresponds to a bright (white) film portions denoted by reference numeral 3 in FIG. 5. In transmission type electron microscope observation, there are amorphous titanium oxide and crystallized TiO in the inside of the titanium oxide film. Further, it is found that the ratio of TiO that is crystallized by heat treatment is increased.

On the surface on which the above fine projections are distributed densely, metal titanium or a titanium compound together with metal titanium, is detected, the titanium compound having a crystal lattice in which the crystal lattice spacing is any of 2.48 Å±1%, 2.15 Å±1%, and 1.52 Å±1%. From results of oblique incident X-ray diffraction in which X-rays are incident at 0.3° from the surface, in addition to metal titanium, as a crystalline material that is present on the surface of the titanium base material, a titanium compound in which the crystal lattice spacing is any of 2.48 Å±1%, 2.15 Å±1%, and 1.52 Å±1% is detected.

Note that, from the surface of a comparative example that has been subjected to passivation treatment in a certain aqueous solution and stabilization treatment after surface formation treatment, in addition to diffraction from metal titanium, diffraction from crystals in which the lattice spacing is any of 2.20 Å+1%, 1.56 Å±1%, 1.33 Å±1%, and 1.27 Å±1% is detected. In contrast, from the surface of the present invention material, diffraction from crystals having such lattice spacing is not detected.

Also on the surface of the present invention material, since titanium is a main component, the main diffraction is definitely from a titanium compound, but a composition thereof cannot be identified. The composition may mainly include titanium, and may also include oxygen and hydrogen.

Since it is assumed that metal titanium or the titanium compound in which the lattice spacing is any of 2.48 Å±1%, 2.15 Å+1%, and 1.52 Å±1% contributes to the low contact resistance of the present invention, the detection of such a crystalline material is one of features of the present invention that should be mentioned specially. The titanium compound having such a lattice spacing reduces defects in the crystal lattice of the titanium oxide film, so that the crystallinity is further increased. Accordingly, the present invention has high durability in a corrosive environment including fluorine and a use environment in which a potential is applied, particularly has extremely high durability against fluorine.

When an element concentration profile obtained by a GDS in a depth direction before heat treatment is compared with that after the heat treatment, the maximum hydrogen concentration is decreased from greater than or equal to 40 atomic % to less than 30 atomic %. As an effect of the heat treatment, containing water in the surface or immediately under the surface, which serves as a hydrogen source, and hydrogen in titanium are considered to have exited from the superficial part by the heat treatment. This result indicates that the heat treatment makes a finer titanium oxide film.

Here, the oblique X-ray diffraction will be described. By use of an X-ray diffraction apparatus SmartLab produced by Rigaku Corporation, a diffraction peak in the oblique X-ray diffraction at an incident angle of 0.3° was measured. As a target, Co-Kα (wavelength λ=1.7902 Å) is used, and a W/Si multi-film mirror (on the incident side) is used to remove Kβ. The X-ray source load power (tube voltage/tube current) is 9.0 kW (45 kV/200 mA). As analysis software, X'Pert High Score Plus produced by Spectris Co., Ltd. is used.

The present invention material is fabricated in a manner that the outermost titanium oxide film and portions immediately under the surface are not allowed to contain carbide, nitride, carbonitride, or boride of titanium.

If at least one of C, N, and B exists as an inevitable mixed element in the titanium base material, carbide, nitride, carbonitride, or boride of titanium may be formed in a heat treatment process. In order to suppress the generation of carbide, nitride, carbonitride, or boride of titanium as much as possible, the sum content of C, N, and B in the titanium base material is preferably less than or equal to 0.1 mass %, more preferably less than or equal to 0.05 mass %.

In the present invention material, it is preferable that a titanium compound containing at least one of C, N, and B be not present in the titanium oxide film. When the surface that has been subjected to sputtering to a depth of about 5 nm in argon is analyzed by an X-ray photoelectron spectrometry (XPS), if C is less than or equal to 10 atomic %, N is less than or equal to 1 atomic %, and B is less than or equal to 1 atomic %, the effects of the present invention can be obtained. Here, the depth of argon sputtering is a value converted from a sputtering rate at a time of sputtering $SiO_2$. Also at a sputtered position of about 5-nm depth from the surface, a peak is detected at a position of about 459.2 eV, which is the coupling energy of $TiO_2$, which is a titanium oxide, in a Ti2p spectrum. Accordingly, the sputtered position of 5-nm depth from the surface is results of analysis in the titanium oxide film. Note that in the data analysis, MultiPak V.8.0 produced by ULVAC-PHI, Inc. is used as analysis software.

Conventionally, it has been known that, when carbide, nitride, or carbonitride of titanium, which is a conductive material, is dispersed on the surface by performing heat treatment in a state where oil of cold rolling remains or under a nitrogen gas atmosphere, the contact resistance thereof becomes a relatively small value. However, without any treatment thereafter, during being exposed to an acid corrosive environment in practical use, such a titanium compound is dissolved and re-precipitated as oxide that inhibits contact conductivity, resulting in a reduction in contact conductivity.

When certain passivation treatment and stabilization treatment are performed on the titanium oxide film, although the durability against a simple acid environment is increased, the durability may not always be maintained in a corrosive environment including fluorine and a use environment in which a potential is applied.

Figure 6:
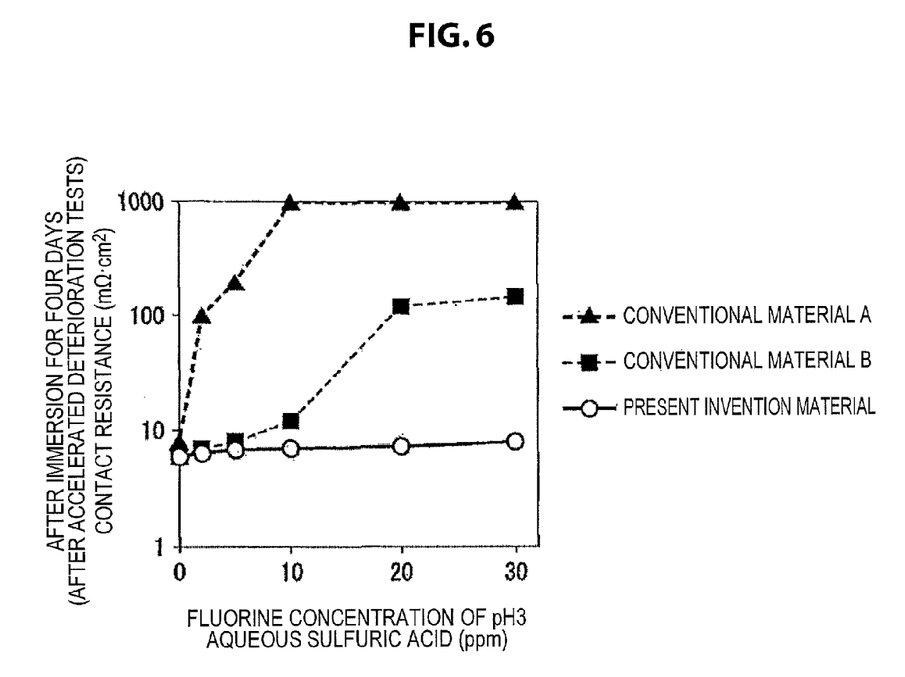
FIG. 6 shows an influence of fluorine concentration in an aqueous sulfuric acid on contact resistance with a carbon paper, the aqueous sulfuric acid being used for accelerated deterioration tests, the carbon paper being used after the accelerated deterioration tests. Note that the aqueous sulfuric acid for the accelerated deterioration tests had a pH of 3 and a temperature of 80° C.; the immersion time was four days; and a potential was not applied. The horizontal axis represents the fluorine concentration and the vertical axis represents the contact resistance with the carbon paper after the accelerated deterioration tests.

FIG. 6 shows an influence of fluorine concentration in a pH 3 aqueous sulfuric acid used in accelerated deterioration tests. When the fluorine concentration is greater than or equal to 2 ppm, the contact resistance with a carbon paper of a conventional material A is increased to be greater than or equal to about 100 mΩ·cm². When the fluorine concentration is greater than or equal to 10 ppm, the contact resistance with a carbon paper of a conventional material B is increased to be greater than or equal to about 100 mΩ·cm². In contrast, even when the fluorine concentration is from 2 to 30 ppm, the contact resistance with a carbon paper of the present invention material is low, which is less than or equal to 10 mΩ·cm², so that high durability against fluorine is exhibited.

Note that the conventional material A is an example in which carbide, nitride, or carbonitride of titanium existing on the surface is covered with titanium oxide. The conventional example B is an example in which, after performing surface formation treatment in the same manner as the present invention, passivation treatment performed in a certain aqueous solution and stabilization treatment are performed in the same manner as the related art.

Accordingly, the present invention material preferably has a contact resistance with a carbon paper of less than or equal to 20 mΩ·cm², more preferably less than or equal to 10 mΩ·cm², at a contact pressure of 10 kgf/cm² after the accelerated deterioration test in which the material is immersed in an aqueous sulfuric acid having an adjusted pH of 3 at 80° C. for four days.

Note that the contact resistance is based on the contact resistance measured by using TGPH-120M produced by Toray Industries, Inc. in the accelerated deterioration tests because the contact resistance changes depending on a carbon paper that is used.

In a case where a potential of 1.0 V (vs SHE) is applied for 24 hours in the pH 3 aqueous sulfuric acid, the contact resistance with a carbon paper of a conventional material is increased to be about 30 mΩ·cm$^2$. In contrast, the present invention material can maintain low contact resistance, which is less than or equal to 20 mΩ·cm$^2$ or less than or equal to 10 mΩ·cm$^2$; that is, high durability can be maintained even when a potential is applied.

Meanwhile, pickling using fluonitric acid performed after bright annealing as pre-treatment and surface formation treatment using fluoride ions performed after bright annealing cause the present invention material to melt in a depth of greater than or equal to 2 μm from the surface, and carbide, nitride, and/or carbonitride of titanium generated on the surface by bright annealing is removed.

Meanwhile, pickling using fluonitric acid performed after bright annealing as pre-treatment and surface formation treatment using hydrofluoric acid performed after bright annealing removes, from the present invention material, carbide, nitride, and/or carbonitride of titanium generated on the surface by bright annealing is substantially removed.

When the above material is further subjected to heat treatment at 260 to 550° C. as stabilization treatment, a surface structure is formed in a manner that carbide, nitride, and/or carbonitride of titanium, which is easily eluted, does not substantially exist, resulting in extremely high durability in a corrosive environment including fluorine and a use environment in which a potential is applied.

Note that, if certain heat treatment is not performed on the titanium oxide film as stabilization treatment, although the initial contact resistance is low, after the accelerated deterioration test, the contact resistance will be increased to be greater than or equal to about 100 mΩ·cm$^2$.

Accordingly, in the present invention material, the contact resistance after the accelerated deterioration test is less than or equal to 20 mΩ·cm$^2$, preferably less than or equal to 10 mΩ·cm$^2$, more preferably less than or equal to 8 mΩ·cm$^2$, still more preferably less than or equal to 6 mΩ·cm$^2$.

Further, the present inventors have found out through experiment that the present invention material having the contact resistance of less than or equal to 10 mΩ·cm$^2$ can endure a durability power generation test of 5,000 hours as a polymer electrolyte fuel cell separator.

Next, a method for manufacturing the present invention material will be described.

A titanium base material is annealed in an inert gas atmosphere, so that a titanium oxide film is formed on the surface of the titanium base material. Annealing is performed by selecting conditions (atmosphere, temperature, time, and the like) such that a titanium compound is unlikely to be generated on the outermost surface. As necessary, next, the surface of the titanium base material is cleaned with a pickling liquid containing hydrofluoric acid (for example, 3.5 mass % hydrogen fluoride+4.5 mass % nitric acid).

After cleaning, surface formation treatment is performed in which fine projections are formed on the surface of the titanium base material, so that fine projections are formed on the entire surface. A liquid for the surface formation treatment is an aqueous solution containing fluoride ions, such as a mixed aqueous solution containing 0.5 mass % HF, 0.5 mass % NaF, 0.5 mass % NaCl, and 0.5 mass % HNO$_3$. As far as the present inventors have found out, by using an aqueous solution in which the fluoride ion concentration is 0.05 to 1.5 mass % and each of HF, NaF, NaCl, and HNO$_3$ is 0.05 to 1.5 mass %, desired fine projections can be formed on the surface of the titanium base material at treatment temperatures of 30 to 40° C. for treatment time of 5 to 20 minutes. In some cases where the concentration, temperature, and time are lower than the above ranges, the formed fine projections do not have sufficient effects of the present invention. On the other hand, in some cases where the concentration, temperature, and time exceed the above ranges, dissolving may proceed and the fine projections may be dissolved to become even, resulting in a failure of demonstration of sufficient effects.

Next, the titanium oxide film covered with the fine projections is subjected to heat treatment at 260 to 550° C. as stabilization treatment, so that the titanium oxide film is strengthened.

The heat treatment is performed to stabilize the above titanium oxide film; however, the treatment time needs to be designed so as to control the thickness of the titanium oxide film at the treatment temperatures of 260 to 550° C. Although preferred treatment time differs depending on the treatment temperature and the atmosphere used in the treatment, the treatment time is preferably 1 to 15 minutes, more preferably 2 to 8 minutes, in terms of stability and productivity of manufacture.

As a result of a power generation test of a fuel cell using the present invention material as a separator, favorable contact conductivity with carbon can be maintained for about 10,000 hours or more at a contact resistance of less than or equal to 10 mΩ·cm$^2$ and 20,000 hours or more at a contact resistance of less than or equal to 6 mΩ·cm$^2$.

As described above, the present invention material has high conductivity and durability, and is highly useful as a base material for a separator for a fuel cell.

It is needless to say that a fuel cell separator including the present invention material as a base material uses the surface of the present invention material without changing it.

Meanwhile, from the related art, it is assumed that a noble-metal-based metal film such as a gold film, a carbon film, or a carbon-containing conductive film may be further formed on the surface of the present invention material. In those cases, in a fuel cell separator using the present invention material as a base material, even if the noble-metal-based metal film such as a gold film, the carbon film, or the carbon-containing conductive film has a defect, corrosion of the titanium base material can be suppressed more than in the related art. This is because the titanium oxide film having high durability, which has been subjected to the passivation treatment and the stabilization treatment, exists immediately under the noble-metal-based metal film, the carbon film, or the carbon-containing conductive film.

The surface of the fuel cell separator including the present invention material as a base material has contact conductivity with a carbon separator and durability which are as high as in the related art. Further, the fuel cell separator including the present invention material as a base material is unlikely to break, and thus can ensure the quality and lifetime of the fuel cell for a long time.

EXAMPLES

Examples of the present invention will be described below. Conditions in the examples are exemplary conditions employed to find out the feasibility and effects of the present invention. The present invention is not limited to the following examples. The present invention can employ various conditions without departing from the spirit and scope of the present invention to achieve the aims of the present invention.

Example 1

In order to find out surface states and contact characteristics of the present invention material, samples were fabricated by varying titanium base materials and conditions for pretreatment, surface formation treatment (fine projections forming treatment), and stabilization treatment (heat treatment). Then, surface states (surface roughness and tip angle of fine projections) were measured, and contact conductivity was measured by conducting accelerated deterioration tests. The measurement results are shown in Table 1 to Table 3 together with the conditions.

[Titanium Base Material]

The titanium base materials are as follows.

M01: Titanium (JIS H 4600 type 1 TP270C) industrial pure titanium type 1

M02: Titanium (JIS H 4600 type 2 TP340C) industrial pure titanium type 2

M03: Titanium (JIS H 4600 type 3 TP480C) industrial pure titanium type 3

M04: Titanium (JIS H 4600 type 4 TP550C) industrial pure titanium type 4

M05: Titanium alloy (JIS H 4600 type 61) 2.5 to 3.5 mass % Al-2 to 3 mass % V—Ti M06: Titanium alloy (JIS H 4600 type 16) 4 to 6 mass % Ta—Ti M07: Titanium alloy (JIS H4600 type 17) 0.04 to 0.08 mass % Pd—Ti M08: Titanium alloy (JIS H4600 type 19) 0.04 to 0.08 mass % Pd-0.2 to 0.8 mass % Co—Ti M09: Titanium alloy (JIS H4600 type 21) 0.04 to 0.06 mass % Ru-0.4 to 0.6 mass % Ni—Ti M10: Titanium alloy 0.02 mass % Pd-0.002 mass % Mm-Ti Here, Mm is mixture of rare earth elements (mischmetal) before separation purification and has a composition of 55 mass % Ce, 31 mass % La, 10 mass % Nd, and 4 mass % Pr.

M11: Titanium alloy 0.03 mass % Pd-0.002 mass % Y—Ti

Note that M10 and M11, which are titanium alloys beyond the JIS standard, were base materials each obtained by molding laboratorially and hot-rolling and cold-rolling.

[Pretreatment]

Conditions for pretreatment on the base material are as follows.

P01: Cold rolling was performed to a thickness of 0.1 mm, rolling oil was washed off and removed, and then bright annealing was performed under an Ar atmosphere at 800° C. for 20 seconds.

P02: Cold rolling was performed to a thickness of 0.1 mm, rolling oil was washed off and removed, and then bright annealing was performed under a N2 atmosphere at 800° C. for 20 seconds.

P03: Cold rolling was performed to a thickness of 0.1 mm, rolling oil was washed off and removed, and then bright annealing was performed under an Ar atmosphere at 800° C. for 20 seconds, followed by cleaning on the surface by using fluonitric acid.

The surface cleaning on P03 by using fluonitric acid was performed by immersion in an aqueous solution containing 3.5 mass % hydrogen fluoride (HF) and 4.5 mass % nitric acid ($HNO_3$) at 45° C. for one minute. Thus, 5 μm in depth from the surface melted.

[Surface Formation Treatment]

An aqueous solution used for surface formation treatment is as follows.

C1: An aqueous solution containing 0.5 mass % HF, 0.5 mass % NaF, 0.5 mass % NaCl, and 0.5 mass % $HNO_3$.

[Stabilization Treatment]

Heat treatment was performed as stabilization treatment.

H01: Heat treatment was performed in a heating furnace.

Note that the heating temperature was varied from 250 to 600° C. and the heating time was varied from 2.5 to 7.5 minutes.

[Accelerated Deterioration Test]

Condition 1. Immersion was performed in a pH 3 sulfuric acid solution at 80° C. containing 20 ppm F ions for four days.

Condition 2: A potential of 1.0 V (vs SHE) was applied for 24 hours in a pH 3 sulfuric acid solution at 80° C.

Evaluation: Excellent, less than 10 mΩ·cm$^2$; Good, 10 to 20 mΩ·cm$^2$; Poor, greater than or equal to 20 mΩ·cm$^2$.

From the samples fabricated by varying the above conditions, test pieces of a predetermined size were extracted, so that the surface states (surface roughness and tip angle of fine projections) were measured and contact conductivity was measured through accelerated deterioration tests. The measurement results are shown in Table 1 to Table 3 together with the conditions.

Table 1 shows results of a case where titanium base materials and conditions for pretreatment were varied.

TABLE 1

| | | 3 | | | | | | |
| --- | --- | --- | --- | --- | --- | --- | --- | --- |
| | | Number | | | | | | |
| | Remark | 1-1 Invention Example | 1-2 Invention Example | 1-3 Invention Example | 1-4 Invention Example | 1-5 Invention Example | 1-6 Invention Example | 1-7 Invention Example |
| Material | Base material | M01 | M01 | M02 | M03 | M04 | M05 | M06 |
| Treatment | Pretreatment | P01 | P03 | P03 | P03 | P03 | P03 | P03 |
| | Surface formation treatment | C1 | C1 | C1 | C1 | C1 | C1 | C1 |
| | Treatment temp. (° C.) | 30 | 30 | 30 | 30 | 30 | 30 | 30 |
| | Treatment time (min) | 10 | 10 | 15 | 15 | 15 | 15 | 15 |
| | Stabilization treatment | H01 | H01 | H01 | H01 | H01 | H01 | H01 |
| | Treatment temp. (° C.) | 300 | 300 | 300 | 300 | 300 | 300 | 300 |
| | Treatment time (min) | 5 | 5 | 5 | 5 | 5 | 5 | 5 |

TABLE 1-continued

| | | 3 | | | | | | |
|---|---|---|---|---|---|---|---|---|
| Surface roughness | Ra (μm) | 0.12 | 0.13 | 0.19 | 0.20 | 0.18 | 0.17 | 0.19 |
| | Rsm (μm) | 3.5 | 3.6 | 3.0 | 3.2 | 2.8 | 3.3 | 2.9 |
| Tip angle | θ (°) | 31 | 33 | 35 | 28 | 28 | 31 | 30 |
| TiO on surface | | | | | | | | |
| Film thickness | (nm) | 7 | 6 | 6 | 7 | 7 | 6 | 7 |
| [Condition 1] | Before accelerated test | 6 | 6 | 7 | 7 | 7 | 6 | 6 |
| Contact conductivity | After accelerated test | 7 | 8 | 8 | 8 | 8 | 7 | 7 |
| (mΩ · cm2) | Evaluation | Excellent | Excellent | Excellent | Excellent | Excellent | Excellent | Excellent |
| [Condition 2] | Before accelerated test | 6 | 6 | 7 | 7 | 7 | 6 | 6 |
| Contact conductivity | After accelerated test | 6 | 7 | 7 | 7 | 7 | 6 | 7 |
| (mΩ · cm2) | Evaluation | Excellent | Excellent | Excellent | Excellent | Excellent | Excellent | Excellent |

| | | Number | | | | |
|---|---|---|---|---|---|---|
| | | 1-8 Invention Example | 1-9 Invention Example | 1-10 Invention Example | 1-11 Invention Example | 1-12 Invention Example |
| | Remark | | | | | |
| Material | Base material | M07 | M08 | M09 | M10 | M11 |
| Treatment | Pretreatment | P03 | P03 | P03 | P03 | P03 |
| | Surface formation treatment | C1 | C1 | C1 | C1 | C1 |
| | Treatment temp. (° C.) | 30 | 30 | 30 | 30 | 30 |
| | Treatment time (min) | 15 | 15 | 15 | 15 | 15 |
| | Stabilization treatment | H01 | H01 | H01 | H01 | H01 |
| | Treatment temp. (° C.) | 300 | 300 | 300 | 300 | 300 |
| | Treatment time (min) | 5 | 5 | 5 | 5 | 5 |
| Surface roughness | Ra (μm) | 0.14 | 0.16 | 0.18 | 0.16 | 0.18 |
| | Rsm (μm) | 2.9 | 3.4 | 3.4 | 3.3 | 3.0 |
| Tip angle | θ (°) | 29 | 30 | 30 | 31 | 32 |
| TiO on surface | | | | | | |
| Film thickness | (nm) | 7 | 7 | 8 | 7 | 7 |
| [Condition 1] | Before accelerated test | 6 | 5 | 5 | 5 | 5 |
| Contact conductivity | After accelerated test | 7 | 6 | 6 | 6 | 6 |
| (mΩ · cm2) | Evaluation | Excellent | Excellent | Excellent | Excellent | Excellent |
| [Condition 2] | Before accelerated test | 6 | 5 | 5 | 5 | 5 |
| Contact conductivity | After accelerated test | 7 | 6 | 6 | 6 | 6 |
| (mΩ · cm2) | Evaluation | Excellent | Excellent | Excellent | Excellent | Excellent |

Table 2 shows results of a case where treatment time and treatment temperatures were varied in surface formation treatment (fine projections forming treatment). Note that Comp. Example 2-1 was obtained by not performing surface formation treatment.

TABLE 2

| | | 1 | | | | | |
|---|---|---|---|---|---|---|---|
| | | Number | | | | | |
| | | 2-1 Comp. Example | 2-2 Comp. Example | 2-3 Comp. Example | 2-4 Invention Example | 2-5 Invention Example | 2-6 Invention Example |
| | Remark | | | | | | |
| Material | Base material | M01 | M01 | M01 | M01 | M01 | M01 |
| Treatment | Pretreatment | P01 | P01 | P01 | P01 | P01 | P01 |
| | Surface formation treatment | — | C1 | C1 | C1 | C1 | C1 |
| | Treatment temp. (° C.) | — | 25 | 30 | 30 | 30 | 30 |
| | Treatment time (min) | — | 5 | 2 | 5 | 10 | 15 |
| | Stabilization treatment | H01 | H01 | H01 | H01 | H01 | H01 |
| | Treatment temp. (° C.) | 300 | 300 | 300 | 300 | 300 | 300 |
| | Treatment time (min) | 5 | 5 | 5 | 5 | 5 | 5 |
| Surface roughness | Ra (μm) | 0.01 | 0.04 | 0.04 | 0.07 | 0.11 | 0.17 |
| | Rsm (μm) | 7.9 | 7.1 | 5.5 | 4.8 | 4.0 | 3.5 |
| | | (—) | (—) | (—) | | | |
| | θ | | | | | | |
| Tip angle | (°) | 155 | 87 | 81 | 50 | 37 | 31 |
| | | (—) | (—) | (—) | | | |
| TiO on surface | | | | | | | |
| Film thickness | (nm) | 25 | 20 | 17 | 15 | 10 | 6 |
| | | (—) | (—) | (—) | | | |

TABLE 2-continued

| | | 1 | | | | | |
|---|---|---|---|---|---|---|---|
| [Condition 1] Contact conductivity (mΩ·cm2) | Before accelerated test | 70 | 18 | 15 | 8 | 7 | 6 |
| | After accelerated test | 1000 | 80 | 23 | 9 | 8 | 7 |
| | Evaluation | Poor | Poor | Poor | Excellent | Excellent | Excellent |
| [Condition 2] Contact conductivity (mΩ·cm2) | Before accelerated test | 70 | 18 | 15 | 8 | 7 | 6 |
| | After accelerated test | 600 | 42 | 20 | 9 | 7 | 7 |
| | Evaluation | Poor | Poor | Poor | Excellent | Excellent | Excellent |

| | | | Number | | | |
|---|---|---|---|---|---|---|
| | | | 2-7 Invention Example | 2-8 Invention Example | 2-9 Invention Example | 2-10 Invention Example |
| | | Remark | | | | |
| Material | Base material | | M01 | M01 | M01 | M01 |
| Treatment | Pretreatment | | P01 | P01 | P01 | P01 |
| | Surface formation treatment | | C1 | C1 | C1 | C1 |
| | Treatment temp. (° C.) | | 30 | 40 | 40 | 40 |
| | Treatment time (min) | | 20 | 5 | 10 | 15 |
| | Stabilization treatment | | H01 | H01 | H01 | H01 |
| | Treatment temp. (° C.) | | 300 | 300 | 300 | 300 |
| | Treatment time (min) | | 5 | 5 | 5 | 5 |
| Surface roughness | Ra (μm) | | 0.29 | 0.13 | 0.3 | 0.4 |
| | Rsm (μm) | | 2.3 | 4.1 | 2.4 | 1.0 |
| | θ | | | | | |
| Tip angle | (°) | | 26 | 48 | 32 | 24 |
| TiO on surface | | | | | | |
| Film thickness | (nm) | | 6 | 6 | 6 | 6 |
| [Condition 1] Contact conductivity (mΩ·cm2) | Before accelerated test | | 6 | 6 | 5 | 5 |
| | After accelerated test | | 7 | 7 | 6 | 6 |
| | Evaluation | | Excellent | Excellent | Excellent | Excellent |
| [Condition 2] Contact conductivity (mΩ·cm2) | Before accelerated test | | 6 | 6 | 5 | 5 |
| | After accelerated test | | 6 | 7 | 6 | 6 |
| | Evaluation | | Excellent | Excellent | Excellent | Excellent |

Table 3 shows results of a case where treatment temperatures and treatment time were varied in stabilization treatment. Note that Comp. Examples 3-1, 3-2, and 3-3 were obtained by not performing surface formation treatment and stabilization treatment. Comp. Examples 3-4, 3-5, and 3-6 were obtained by performing stabilization treatment at heating temperatures of less than 260° C.

TABLE 3

| | | 2 | | | | | | | |
|---|---|---|---|---|---|---|---|---|---|
| | | Number | | | | | | | |
| | | 3-1 Comp. Example | 3-2 Comp. Example | 3-3 Comp. Example | 3-4 Comp. Example | 3-5 Comp. Example | 3-6 Comp. Example | 3-7 Comp. Example | 3-8 Invention Example |
| | Remark | | | | | | | | |
| Material | Base material | M01 | M01 | M01 | M01 | M01 | M01 | M01 | M01 |
| Treatment | Pretreatment | P01 | P02 | P03 | P01 | P02 | P03 | P03 | P03 |
| | Surface formation treatment | — | — | — | — | — | — | C1 | C1 |
| | Treatment temp. (° C.) | — | — | — | — | — | — | 30 | 30 |
| | Treatment time (min) | — | — | — | — | — | — | 15 | 15 |
| | Stabilization treatment | — | — | — | H01 | H01 | H01 | H01 | H01 |
| | Treatment temp. (° C.) | — | — | — | 300 | 300 | 300 | 250 | 275 |
| | Treatment time (min) | — | — | — | 5 | 5 | 5 | 5 | 5 |
| Surface roughness | Ra (μm) | 0.03 | 0.03 | 0.07 | 0.03 | 0.03 | 0.06 | 0.18 | 0.17 |
| | Rsm (μm) | 6.0 | 6.1 | 5.8 | 6.0 | 6.1 | 5.8 | 3.2 | 3.1 |
| | | (—) | (—) | (—) | (—) | (—) | (—) | | |
| | θ | | | | | | | | |
| Tip angle | (°) | 142 | 137 | 121 | 147 | 141 | 129 | 32 | 31 |
| | | (—) | (—) | (—) | (—) | (—) | (—) | | |
| TiO on surface | | | | | | | | | |
| Film thickness | (nm) | 5 | 6 | 5 | 6 | 5 | 5 | 5 | 5 |
| [Condition 1] Contact conductivity (mΩ·cm2) | Before accelerated test | 15 | 13 | 40 | 73 | 71 | 78 | 5 | 6 |
| | After accelerated test | 1000 | 1000 | 1000 | 1000 | 1000 | 1000 | 90 | 7 |
| | Evaluation | Poor | Poor | Poor | Poor | Poor | Poor | Poor | Excellent |

TABLE 3-continued

| | | 2 | | | | | | |
|---|---|---|---|---|---|---|---|---|
| [Condition 2] Contact conductivity (mΩ·cm2) | Before accelerated test After accelerated test Evaluation | 15 1000 Poor | 13 1000 Poor | 40 1000 Poor | 73 1000 Poor | 71 1000 Poor | 78 1000 Poor | 5 21 Poor | 6 6 Excellent |

| | | Number | | | | | | |
|---|---|---|---|---|---|---|---|---|
| | Remark | 3-9 Invention Example | 3-10 Invention Example | 3-11 Invention Example | 3-12 Invention Example | 3-13 Invention Example | 3-14 Invention Example | 3-15 Invention Example |
| Material | Base material | M01 | M01 | M01 | M01 | M01 | M01 | M01 |
| Treatment | Pretreatment | P03 | P03 | P03 | P03 | P03 | P03 | P03 |
| | Surface formation treatment | C1 | C1 | C1 | C1 | C1 | C1 | C1 |
| | Treatment temp. (° C.) | 30 | 30 | 30 | 30 | 30 | 30 | 30 |
| | Treatment time (min) | 15 | 15 | 15 | 15 | 15 | 15 | 15 |
| | Stabilization treatment | H01 | H01 | H01 | H01 | H01 | H01 | H01 |
| | Treatment temp. (° C.) | 300 | 300 | 300 | 400 | 500 | 550 | 600 |
| | Treatment time (min) | 2.5 | 5 | 7.5 | 5 | 5 | 5 | 5 |
| Surface roughness | Ra (μm) | 0.19 | 0.15 | 0.16 | 0.15 | 0.14 | 0.12 | 0.1 |
| | Rsm (μm) | 2.9 | 3.3 | 3.0 | 2.3 | 1.6 | 1.0 | 0.4 (—) |
| Tip angle | θ (°) | 28 | 32 | 29 | 30 | 33 | 35 | 37 |
| TiO on surface Film thickness | (nm) | 6 | 6 | 6 | 8 | 13 | 15 | 27 (—) |
| [Condition 1] Contact conductivity (mΩ·cm2) | Before accelerated test After accelerated test Evaluation | 6 7 Excellent | 6 7 Excellent | 6 7 Excellent | 7 8 Excellent | 8 9 Excellent | 9 9 Excellent | 19 21 Poor |
| [Condition 2] Contact conductivity (mΩ·cm2) | Before accelerated test After accelerated test Evaluation | 6 6 Excellent | 6 6 Excellent | 6 6 Excellent | 7 7 Excellent | 8 8 Excellent | 9 9 Excellent | 19 20 Poor |

Tables 1 to 3 indicate that the contact conductivity of each of Invention Examples is much higher than that of Comp. Examples (conventional materials).

INDUSTRIAL APPLICABILITY

As described above, according to the present invention, it becomes possible to provide a titanium or titanium alloy material for a fuel cell separator having high contact conductivity with carbon and high durability. Accordingly, it becomes possible to greatly increase the lifetime of a fuel cell. Therefore, the present invention has high usability in the cell manufacturing industry.

REFERENCE SIGNS LIST 1 titanium or titanium alloy material
2 fine projection
3 titanium oxide film

The invention claimed is:

1. A titanium or titanium alloy material for a fuel cell separator, comprising:
   a surface in which a plurality of projections are distributed,
   wherein a tip angle θ measured based on tip angles of the plurality of projections is 20° to 60°; and
   a titanium oxide film on a surface of each of the plurality of projections,
   wherein, as a result of oblique incident X-ray diffraction, metal titanium and a titanium compound are detected on the surface, the titanium compound having a crystal lattice spacing of any one of 2.48 Å±1%, 2.15 Å±1%, and 1.52 Å±1%.

2. The titanium or titanium alloy material for a fuel cell separator according to claim 1,
   wherein a surface roughness RSm is 0.5 to 5.0 μm and a surface roughness Ra is 0.05 to 0.50 μm.

3. The titanium or titanium alloy material for a fuel cell separator according to claim 1,
   wherein the titanium oxide film is subjected to heat treatment at 260 to 550° C. and has a thickness of 3 to 15 nm.

4. The titanium or titanium alloy material for a fuel cell separator according to claim 1,
   wherein a contact resistance with a carbon paper is less than or equal to 10 mΩ·cm$^2$ at a contact pressure of 10 kgf/cm$^2$.

5. The titanium or titanium alloy material for a fuel cell separator according to claim 1,
   wherein a contact resistance with a carbon paper is less than or equal to 20 mΩ·cm$^2$ at a contact pressure of 10 kgf/cm$^2$ after an accelerated deterioration test in which the titanium or titanium alloy material is immersed in an aqueous sulfuric acid having an adjusted pH of 3 at 80° C. for four days.

6. A fuel cell separator comprising:
   the titanium or titanium alloy material for a fuel cell separator according to claim 1.

7. A fuel cell separator comprising:
   the titanium or titanium alloy material for a fuel cell separator according to claim 5.

* * * * *